UNITED STATES PATENT OFFICE.

GEORGE S. JOHNSTON, OF CHICAGO, ILLINOIS, ASSIGNOR TO GEO. S. JOHNSTON COMPANY, OF CHICAGO, ILLINOIS, A CORPORATION OF ILLINOIS.

CEMENT.

1,132,721.

Specification of Letters Patent. Patented Mar. 23, 1915.

No Drawing. Application filed January 23, 1914. Serial No. 813,860.

*To all whom it may concern:*

Be it known that I, GEORGE S. JOHNSTON, a citizen of the United States, and a resident of Chicago, in the county of Cook and State of Illinois, have invented a certain new and useful Cement, of which the following is a specification.

My present invention has special reference to the provision of a cement suitable for uniting spectacle or eye-glass lenses to their mountings.

The difficulty of uniting certain surfaces by means of cement is generally known, and among the most difficult of such surfaces to so unit, are glass and the metals of which spectacle and eye glass mountings are usually made. While cements may be made to adhere to both glass and a metal, such adhesion as may be secured is destroyed in the course of time by the variation between the expansion and contraction of the glass and metal and of the cement following and occasioned by changes in temperature, or the adhesion may be destroyed by the shock resulting from a blow or a fall or otherwise.

So far as I am aware, there is no cement which will unite glass and a metal, or more particularly spectacle and eye glass lenses with their mountings in a dependable and satisfactory manner.

I have concluded that if the initial relative movement between the layer of cement and the surface to which it is applied, such as is caused by the expansion and contraction or a shock, as above instanced, could be prevented, a cementing action could be secured which would be dependable and satisfactory.

I have, I believe, accomplished the above object of preventing the initial slip between the cemented surfaces, and have secured a dependable and satisfactory cement for glass and metal, and particularly for securing spectacle and eye glass lenses to their mountings, by means of the compound hereinafter described and claimed.

For cementing glass to a metal the coefficient of expansion of a cement composed entirely of a cementitious element or elements is quite different from that of either of the cemented members, and changes of temperature will cause tension or strain between the cement and the cemented member. The loosening effect of this tension or strain is manifest chiefly in the lateral and vertical direction. In the lateral direction there is a tendency of the cement to move or slip upon the surface of the cemented member which results in a gradual loosening of the cement beginning at the outer portion of the cemented area. In the vertical direction this tension or strain is manifest by the linear difference of expansion or contraction of the cement at different portions of the cemented area because of the variation in the thickness of the film or layer of cement. For eliminating this strain I have devised a cement composed of cementitious and non-cementitious elements. For the cementitious element I use mastic, copal, dammar, shellac or some similar adhesive material with which I thoroughly mix or incorporate certain non-cementitious elements such as glass, garnet, emery, quartz, silex, calcium carbonate, barium sulfate, or other suitable non-cementitious substance the linear coefficient of expansion of which is more nearly that of either of the cemented members than that of the non-cementitious element or elements. For one or more of the non-cementitious elements of my cement I make use of an abradant, or a material of sufficient hardness to abrade or indent the surface of either of the cemented members, such as glass, emery or garnet. This abradant element is in the form of small grains or granules a portion of which lie in intimate contact with the cemented members and which, by their abradant properties, tend to indent themselves into the surface of the cemented members. This indentation thus offers a mechanical resistance to the lateral movement or slip of the cement upon the cemented surfaces, already described. In addition to the abradant element I also incorporate in my cement other non-cementitious elements such as silex, glass, garnet, emery, barium sulfate, quartz, or calcium carbonate in a more finely divided state than the abradant portion. This finely divided portion may be abradant or non-abradant and is for the purpose of rendering the linear coefficient of expansion of the cement as a whole more nearly that of the cemented members than that of the cementitious element alone. By this means I eliminate the strain in the vertical direction due to the variation in thickness of the cement film or layer, already described, and, at the same time, assist in the elimination of the lateral movement or slip of the cement upon the surface of the cemented members.

Another advantage of my invention is that, by the incorporation of the non-cementitious elements described, the cementitious element is divided into numerous comparatively small areas of contact over the cemented area by the interposition of the non-cementitious elements.

It will readily be seen that a more secure adhesion to the cemented member is thus secured for the reason that a variation of temperature sufficient to cause a loosening at the edge of the cemented area of a cement composed entirely of cementitious elements would be insufficient when the cemented area is divided into numerous small areas of contact.

A desirable formula for compounding my cement is the following: Shellac, 40 parts, glass grains, 25 parts, silex, 5 parts, barium sulfate, 10 parts, calcium carbonate, 20 parts.

The proportions may be changed as circumstances may require, but when the desired proportions have been determined upon the various ingredients are brought together and thoroughly mixed or commingled. The mass is then subjected to heat until the cementitious portion thereof is fused with the other ingredients thoroughly mixed therein. The fused mass is permitted to harden, and it is then pulverized by crushing instead of grinding, which tends to preserve the sharpness of the grains of the abradant and other cementitiously inert portions. It is then graded by sifting with screens of a suitable fineness.

The cement is finally applied by putting the powder upon the surfaces to be united, subjecting the surfaces so powdered to heat until the cementitious element is fused and then putting the surfaces together and permitting the whole to cool, harden and solidify. It will then be found that the lenses have been firmly and dependably cemented in their mounts.

Having described my invention, what I claim as new and desire to secure by Letters Patent, is:—

1. As a new article of manufacture, a cement for joining eye glass crystals to their mountings, comprising shellac, glass grains, silex, barium sulfate, and calcium carbonate, substantially in the proportions by weight of 40, 25, 5, 10 and 20, respectively.

2. As a new article of manufacture, a cement for joining eye glass crystals to their mountings, comprising shellac, glass grains, silex, barium sulfate, and calcium carbonate, substantially in the proportions by weight of shellac 40 parts, glass grains and silex 30 parts, and barium sulfate and calcium carbonate 30 parts.

3. As a new article of manufacture, a cement for joining eye glass crystals to their mountings, comprising shellac, glass grains, silex, barium sulfate, and calcium carbonate, the glass grains, silex, barium sulfate, and calcium carbonate together constituting at least 40 per cent. by weight of the total cement.

4. As a new article of manufacture, a cement for joining eye glass crystals to their mountings, comprising cementitious material, glass grains, silex, barium sulfate, and calcium carbonate, the cementitious material constituting not over 60 per cent. by weight of the total cement.

5. As a new article of manufacture, a cement for joining eye glass crystals to their mountings, comprising cementitious material, glass grains, silex, barium sulfate, and calcium carbonate, the cementitious material comprising substantially 40 per cent. by weight of the total, and the barium sulfate and calcium carbonate constituting substantially 30 per cent. by weight of the total.

In testimony whereof I affix my signature in the presence of two witnesses.

GEORGE S. JOHNSTON.

Witnesses:
C. C. ALLEN,
BENJ. T. ROODHOUSE.